UNITED STATES PATENT OFFICE.

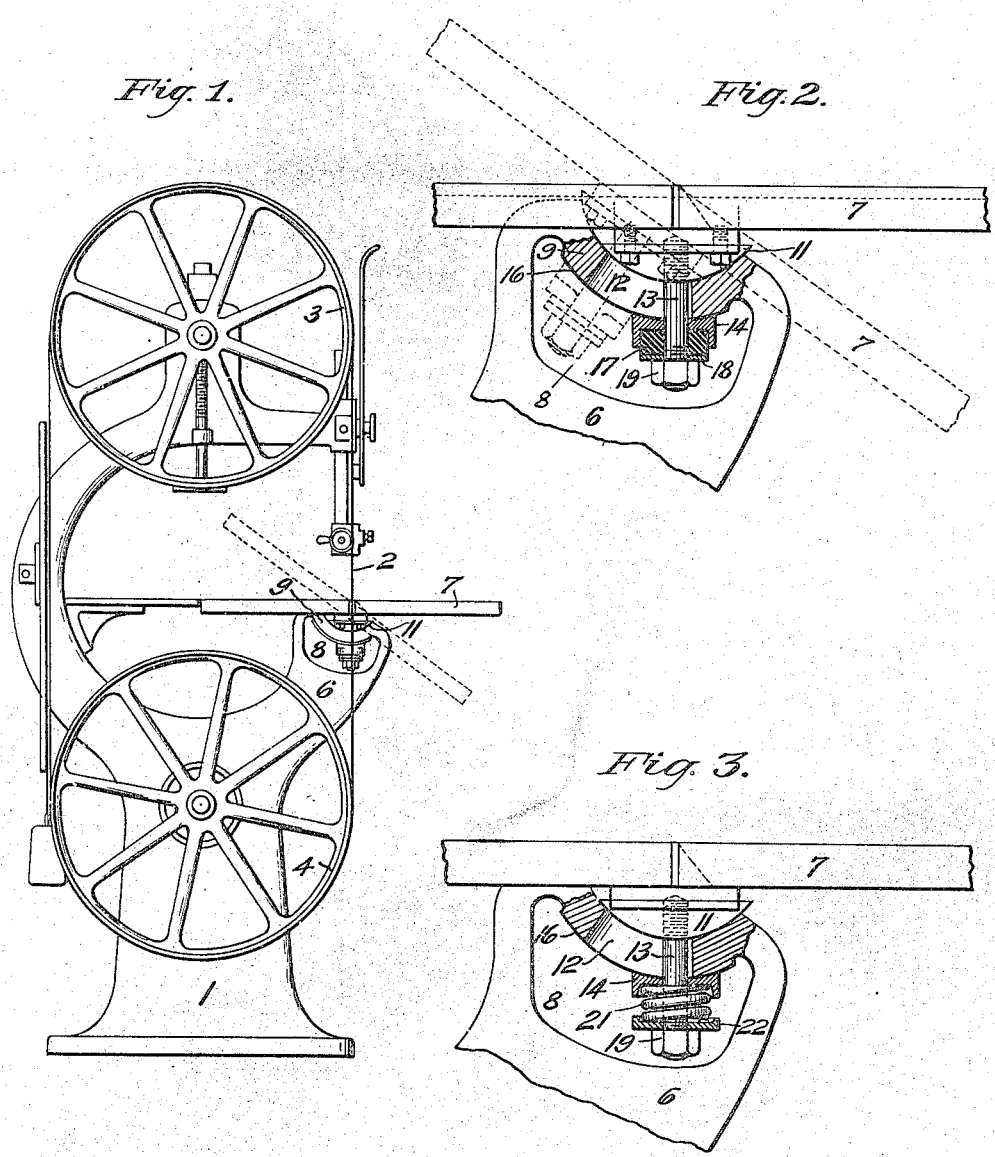

ARTHUR P. THOMAS AND GEORGE CARLSON, OF SAN FRANCISCO, CALIFORNIA.

BAND-SAW MACHINE.

1,139,823.  Specification of Letters Patent.  Patented May 18, 1915.

Application filed April 24, 1913. Serial No. 763,269.

*To all whom it may concern:*

Be it known that we, ARTHUR P. THOMAS and GEORGE CARLSON, citizens of the United States, residing at San Francisco, in the county of San Francisco and State of California, have invented new and useful Improvements in Band-Saw Machines, of which the following is a specification.

The present invention relates to improvements in band saw machines and the object of the invention is to provide an adjustable support for the table of a band saw machine, which will firmly and automatically support it in any sloping position to which it is adjusted.

In the accompanying drawing, Figure 1 is a side elevation of a band saw machine having our invention embodied therein; Fig. 2 is an enlarged sectional view of the same the table being broken away; Fig. 3 is a view similar to Fig. 2 of a modification of the invention.

Referring to the drawing, 1 indicates the frame of a band saw machine, 2 being the band saw traveling around upper and lower pulleys 3, 4.

6 is an extension of the frame upon which the work table 7 of the band saw is supported, said extension having therethrough a transverse aperture 8, and a narrow curved portion 9 above said aperture. On the bottom of the work table is secured a curved extension 11 the lower side of which is in the form of a cylinder having for its axis the horizontal line constituting the intersection of the upper surface of the work table with the band saw when at right angles to its plane, and the upper and lower surfaces of the narrow portion 9 of the extension are concave and in the form of a cylinder about the same axis, so that said extension can turn with a snug fit in the cylindrical cavity of said extension. Said narrow portion of the extension is formed with a slot 12 through which passes a stem 13, the upper end of which is secured into said extension, while the lower end is threaded. Loosely surrounding said stem is an inverted cup 14, the upper surface of which is cylindrically concave to fit snugly against the cylindrical lower surface 16 of said portion 9, and in said cup around said stem is a rubber sleeve 17. Below said sleeve 17 is a washer 18 pressed upwardly by a nut 19 secured on the lower threaded end of said stem. The pressure of said cup against said extension, due to the resiliency of the rubber sleeve 17, can be varied as desired by screwing said nut.

In Fig. 3, a metallic spring 21 is substituted for the rubber sleeve 17, and a cup-shaped washer 22 pressed against the lower end of said spring.

With this construction the work table, on being tilted to any sloping position desired, is automatically firmly supported in said position.

We claim:—

In means for frictionally holding an article to a slotted support having a convex lower surface, a threaded stem secured to the article and passing through said slot, an inverted cup around said stem having an upper surface curved to conform to said lower surface, a spring around the stem within said cup, and a nut screwed on the threaded lower end of the stem and pressing against said spring.

In testimony whereof we have hereunto set our hands in the presence of two subscribing witnesses.

ARTHUR P. THOMAS.
GEORGE CARLSON.

Witnesses:
 D. B. RICHARDS,
 FRANCIS M. WRIGHT.